(12) United States Patent
Robinson et al.

(10) Patent No.: US 9,813,837 B2
(45) Date of Patent: Nov. 7, 2017

(54) SCREEN-RELATIVE RENDERING OF AUDIO AND ENCODING AND DECODING OF AUDIO FOR SUCH RENDERING

(71) Applicant: Dolby Laboratories Licensing Corporation, San Francisco, CA (US)

(72) Inventors: Charles Q. Robinson, Piedmont, CA (US); Nicolas R. Tsingos, Palo Alto, CA (US); Freddie Sanchez, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/035,738

(22) PCT Filed: Nov. 11, 2014

(86) PCT No.: PCT/US2014/065071
§ 371 (c)(1),
(2) Date: May 10, 2016

(87) PCT Pub. No.: WO2015/073454
PCT Pub. Date: May 21, 2015

(65) Prior Publication Data
US 2016/0286333 A1   Sep. 29, 2016

Related U.S. Application Data

(60) Provisional application No. 61/904,233, filed on Nov. 14, 2013.

(51) Int. Cl.
*H04S 7/00* (2006.01)
*H04R 3/12* (2006.01)
(Continued)

(52) U.S. Cl.
CPC ............. *H04S 7/308* (2013.01); *H04R 3/12* (2013.01); *H04S 3/008* (2013.01); *G11B 2020/10601* (2013.01); *H04S 2400/11* (2013.01)

(58) Field of Classification Search
CPC ...... H04S 7/308; H04S 3/008; H04S 2400/11; H04R 3/12; G11B 2020/10601
See application file for complete search history.

(56) References Cited

U.S. PATENT DOCUMENTS 5,796,843 A   8/1998  Inanaga
9,172,901 B2  10/2015 Chabanne
(Continued)

FOREIGN PATENT DOCUMENTS

| JP | 2007-266967 | 10/2007 |
|---|---|---|
| WO | 2013/000740 | 1/2013 |
| WO | 2013/006338 | 1/2013 |

OTHER PUBLICATIONS

Kearney, G. et al "Audio-Visual Processing Tools for Auditory Scene Synthesis" presented at the AES 124th Convention, Amsterdam, The Netherlands, May 17-20, 2008, pp. 1-9.
(Continued)

*Primary Examiner* — Sonia Gay (57) ABSTRACT

In some embodiments, methods for generating an object based audio program including screen-elated metadata indicative of at least one warping degree parameter for at least one audio object, or generating a speaker channel-based program including by warping audio content of an object based audio program to a degree determined at least in part by at least one warping degree parameter, or methods for decoding or rendering any such audio program. Other aspects are systems configured to perform such audio signal generation, decoding, or rendering, and audio processing
(Continued)

units (e.g., decoders or encoders) including a buffer memory which stores at least one segment of any such audio program.

16 Claims, 3 Drawing Sheets

(51) Int. Cl.
    *G11B 20/10*     (2006.01)
    *H04S 3/00*     (2006.01)

(56) References Cited

U.S. PATENT DOCUMENTS

| | | | |
|---|---|---|---|
| 2005/0175197 A1* | 8/2005 | Melchior | H04R 3/12 381/310 |
| 2010/0328419 A1 | 12/2010 | Etter | |
| 2013/0236039 A1 | 9/2013 | Jax | |
| 2015/0131966 A1* | 5/2015 | Zurek | H04S 3/008 386/241 |
| 2015/0332680 A1 | 11/2015 | Crockett | |

OTHER PUBLICATIONS

Chen, Wei-Ge et al "Enhancing Stereophonic Teleconferencing with Microphone Arrays through Sound Field Warping" IEEE International workshop on Multimedia Signal Processing, Oct. 4-6, 2010, pp. 29-33.

* cited by examiner

SCREEN-RELATIVE RENDERING OF AUDIO AND ENCODING AND DECODING OF AUDIO FOR SUCH RENDERING

CROSS-REFERENCE TO RELATED APPLICATIONS

This application claims the benefit of priority to U.S. Provisional Patent Application No. 61/904,233 filed 14 Nov. 2013, which is hereby incorporated by reference in its entirety.

TECHNICAL FIELD OF THE INVENTION

The invention pertains to encoding, decoding, and rendering of audio programs having corresponding video content (e.g., soundtracks of movies or other audiovisual programs). In some embodiments, the programs are object based audio programs which include at least one audio object channel, screen-related metadata, and typically also speaker channels. The screen-related metadata supports screen-relative rendering in which sound sources indicated by the program (e.g., objects indicated by object channels) are rendered at positions (determined at least in part by the screen-related metadata) relative to a playback system's display screen.

BACKGROUND OF THE INVENTION

Embodiments of the invention pertain to one or more aspects of an audio content creation and distribution pipeline (e.g., a pipeline for creating and distributing the audio content of an audiovisual program).

Such a pipeline implements generation of an audio program (typically an encoded audio program indicative of audio content and metadata corresponding to the audio content). Generation of an audio program may include audio production activities (the capture and recording of audio), and optionally also "post production" activities (the manipulation of recorded audio). Live broadcast by necessity requires that all authoring decisions are made during audio production. In generation of cinema and other non-realtime programs, many authoring decisions may be made during post production.

An audio content creation and distribution pipeline optionally implements remixing and/or remastering of a program. In some cases a program may require additional processing after content creation to repurpose the content for an alternative use case. For example, a program originally created for playback in a cinema may be modified (e.g., remixed) to be more suitable for playback in a home environment.

An audio content creation and distribution pipeline typically includes an encoding stage. An audio program may require encoding to enable distribution. For example, a program intended for playback in the home will typically be data compressed to allow more efficient distribution. The encoding process may include steps of reducing the complexity of the spatial audio scene, and/or data rate reduction of individual audio streams of the program, and/or packaging of multiple channels of audio content (e.g., compressed audio content) and corresponding metadata into a bitstream having a desired format.

An audio content creation and distribution pipeline includes a stage of decoding and rendering (typically implemented by a playback system including a decoder). Ultimately the program is presented to the end consumer by rendering the audio description to loudspeaker signals based on the playback equipment and environment.

Typical embodiments of the invention allow audio programs (e.g., soundtracks of movies or other programs having audio and image content) to be reproduced such that the location of auditory images is reliably presented in a way that is consistent with the location of corresponding visual images.

Figure 1:
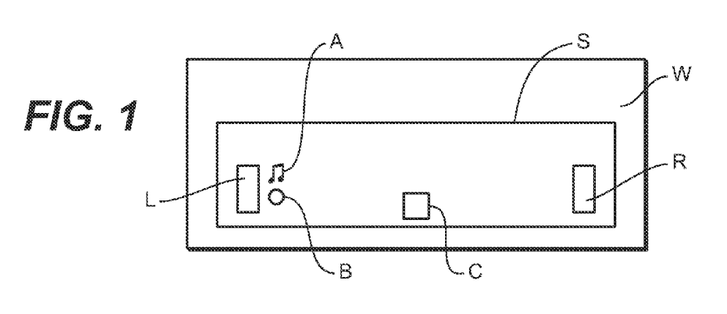
FIG. 1 is a diagram of the front wall (W) of a movie theater with a display screen (S) and left and right front speakers (L and R) and front center speaker (C) mounted to (or near to) the front wall.

Traditionally, in a cinema mixing room (or other audiovisual program authoring environment) the location and size of a display screen (referred to herein as a "reference" screen, to distinguish it from an audiovisual program playback screen) coincide with the front wall of the mixing environment and the left and right edges of the reference screen coincide with positions of left and right main screen loudspeakers. An additional center screen channel is generally located in the middle of the reference screen/wall. Thus the front wall extent, frontal loudspeaker locations, and screen location are consistently co-located. Typically, the reference screen is approximately as wide as the room, and the left, center, and right loudspeakers are near the left edge, center, and right edge of the reference screen. This arrangement is similar to the typical arrangement of the screen and frontal speakers in the expected movie theater playback location. For example, FIG. 1 is a diagram of the front wall (W) of such a movie theater, with display screen S, left and right front speakers (L and R), and front center speaker (C) mounted to (or near to) the front wall. During playback of a movie, a visual image B may be displayed on screen S, while an associated sound "A" is emitted from the speakers of the playback system (including speakers L, R, and C). For example, image B may be the image of a sound source (e.g., a bird or helicopter) and sound "A" may be sound intended to be perceived as emitting from the sound source. We assume that the movie has been authored and rendered so that sound A is perceived as emitting from a sound source location which coincides (or nearly coincides) with the location on screen S at which image B is displayed, when the frontal speakers are positioned coplanar with the screen S, with left front and right front speakers (L and R) at screen S's left and right edges, and a center front speaker near to screen S's center. FIG. 1 assumes that screen S is at least substantially acoustically transparent, and that speakers L, C, and R are mounted behind (but at least substantially in the plane of) screen S.

However, during playback in a consumer's home (or by mobile user's portable playback device), the size and positions of the frontal speakers (or headset speakers) of the playback system relative to each other and relative to the display screen of the playback system need not match those of the frontal speakers and display screen of the program authoring environment (e.g., cinema mixing room). In such playback cases, the width of the playback screen is typically significantly less than the distance separating left and right main speakers (left and right front speakers, or the speakers of a headset, e.g., a pair of headphones). It is also possible that the screen is not centered or even at a fixed position relative to the main speakers (e.g., in the case of a mobile user wearing headphones and holding a display device). This can create noticeable discrepancies between the perceived audio and visuals.

Figure 2:
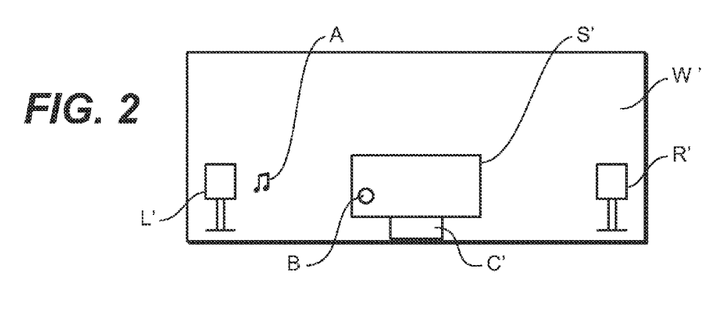
FIG. 2 is a diagram of the front wall (W') of a room with the display screen (S'), left and right front speakers (L' and R'), and front center speaker (C') of a home theater system mounted to (or near to) the front wall.

For example, FIG. 2 is a diagram of the front wall (W') of a room with the display screen (S'), left and right front speakers (L' and R'), and front center speaker (C') of a home theater system mounted to (or near to) the front wall. During playback (by the FIG. 2 system) of the same movie described in the FIG. 1 example, visual image B is displayed on screen S', while associated sound A is emitted from the speakers of the playback system (including speakers L', R', and C'). We have assumed that the movie has been authored for rendering and playback (by a movie theater playback system) with sound A perceived as emitting from a sound source location which coincides (or nearly coincides) with the location on a movie theater screen at which image B is displayed. However, when the movie is played by the home theater system of FIG. 2, sound A will be perceived as emitting from a sound source location, near to the left front speaker L', which neither coincides nor nearly coincides with the location on home theater screen S' at which image B is displayed. This is because the frontal speakers L', C', and R' of the home theater system have different sizes and positions relative to screen S' than the frontal speakers of the program authoring system have relative to the reference screen of the program authoring system.

In the example of FIGS. 1 and 2, the expected cinema playback system is assumed to have a well-defined relationship between its loudspeakers and screen, and thus the content creator's desired relative locations for the displayed images and corresponding audio sources can be reproduced reliably (during playback in a cinema). For playback in other environments (e.g., in a home audio-video room), the assumed relationship between loudspeakers and screen is typically not preserved, and thus the relative locations of the displayed images and corresponding audio sources (which are desired by the content creator) are typically not well reproduced. The relative locations of displayed images and corresponding audio sources actually achieved during playback (other than in a cinema having the assumed relationship between loudspeakers and screen) are based on the actual relative locations and sizes of the playback system's loudspeakers and display screen.

During playback of an audiovisual program, for sounds that are rendered to be perceived at on-screen locations, the optimal auditory image position is independent of the listener position. For sounds that are rendered to be perceived at off-screen locations (at a non-zero distance in a direction perpendicular to the plane of the screen), there is potential for parallax errors in the aurally perceived location of the sound source, depending on the listener position. Methods have been proposed which attempt to minimize or eliminate such parallax error based on a known or assumed listener position.

It is known to employ high-end playback systems (e.g., in movie theaters) to render object based audio programs (e.g., object based programs indicative of movie soundtracks). For example, object based audio programs which are movie soundtracks may be indicative of many different sound elements (audio objects) corresponding to images on a screen, dialog, noises, and sound effects that emanate from different places on (or relative to) the screen, as well as background music and ambient effects (which may be indicated by speaker channels of the program) to create the intended overall auditory experience. Accurate playback of such programs requires that sounds be reproduced in a way that corresponds as closely as possible to what is intended by the content creator with respect to audio object size, position, intensity, movement, and depth.

Object based audio programs represent a significant improvement over traditional speaker channel-based audio programs, since speaker-channel based audio is more limited with respect to spatial playback of specific audio objects than is object channel based audio. The audio channels of speaker channel-based audio programs consist of speaker channels only (not object channels), and each speaker channel typically determines a speaker feed for a specific, individual speaker in a listening environment.

Various methods and systems for generating and rendering object based audio programs have been proposed. During generation of an object based audio program, it is typically assumed that an arbitrary number of loudspeakers will be employed for playback of the program, and that the loudspeakers to be employed (typically, in a movie theater) for playback will be located in arbitrary locations in the playback environment; not necessarily in a (nominally) horizontal plane or in any other predetermined arrangement known at the time of program generation. Typically, object-related metadata included in the program indicates rendering parameters for rendering at least one object of the program at an apparent spatial location or along a trajectory (in a three dimensional volume), e.g., using a three-dimensional array of speakers. For example, an object channel of the program may have corresponding metadata indicating a three-dimensional trajectory of apparent spatial positions at which the object (indicated by the object channel) is to be rendered. The trajectory may include a sequence of "floor" locations (in the plane of a subset of speakers which are assumed to be located on the floor, or in another horizontal plane, of the playback environment), and a sequence of "above-floor" locations (each determined by driving a subset of the speakers which are assumed to be located in at least one other horizontal plane of the playback environment). Examples of rendering of object based audio programs are described, for example, in PCT International Application No. PCT/US2011/028783, published under International Publication No. WO 2011/119401 A2 on Sep. 29, 2011, and assigned to the assignee of the present application.

The advent of object based audio program rendering has significantly increased the amount of the audio data processed and the complexity of rendering that must be performed by rendering systems, in part because an object based audio program may be indicative of many objects (each with corresponding metadata) and may be rendered for playback by a system including many loudspeakers. It has been proposed to limit the number of object channels included in an object based audio program so that an intended rendering system has capability to render the program. For example, U.S. Provisional Patent Application No. 61/745,401, entitled "Scene Simplification and Object Clustering for Rendering Object based Audio Content," filed on Dec. 21, 2012, naming Brett Crockett, Alan Seefeldt, Nicolas Tsingos, Rhonda Wilson, and Jeroen Breebaart as inventors, and assigned to the assignee of the present invention, describes methods and apparatus for so limiting the number of object channels of an object based audio program by clustering input object channels to generate clustered object channels which are included in the program and/or by mixing audio content of input object channels with speaker channels to generate mixed speaker channels which are included in the program. It is contemplated that some embodiments of the present invention may be performed in conjunction with such clustering (e.g., in a mixing or remixing facility) to generate an object based program for delivery (with screen-related metadata) to a playback system, or for use in generating a speaker channel-based program for delivery to a playback system.

BRIEF DESCRIPTION OF THE INVENTION

Throughout this disclosure, including in the claims, "warping" of at least one channel (e.g., object channels or speaker channels) of an audio program assumes that the program has corresponding video content (e.g., the program may be the soundtrack of a movie or other audiovisual program) and denotes processing of audio content (audio data) of each said channel to generate warped audio content (or replacement of each said channel with at least one other audio channel indicative of warped audio content), such that when the warped audio content is rendered to generate speaker feeds and the speaker feeds are employed to drive playback speakers, the sound emitted from the speakers is indicative of at least one audio element (which the content creator intended to be perceived at least one predetermined position relative to a reference screen, e.g., a movie theater screen) having a perceived warped position (which may be fixed or may vary over time). The warped position is "warped" in the sense that it is a predetermined position relative to a playback system's display screen (rather than relative to the reference screen assumed by the content creator). Typically, each warped position is determined (at least in part) relative to the playback system's display screen (sometimes referred to as a "playback screen") by metadata (referred to herein as "screen-related" metadata) provided with (e.g., included in) the audio program. Each warped position may be determined by screen-related metadata and other data indicative of playback system configuration (e.g., data indicative of positions, or positions and sizes, and/or relationship(s) between sizes and/or positions of speakers and a display screen of a playback system). The warped position(s) may but need not coincide with the actual playback screen. Some embodiments of the invention allow smooth transitions between warped positions that are on-screen and/or off-screen (relative to the playback screen) and which vary during playback.

Herein, the expression "off-screen warping" of at least one channel of a program denotes "warping" of the at least one channel, of a type in which the warped position of at least one corresponding audio element (determined by audio content of the at least one channel) is at a non-zero depth relative to the playback screen (i.e., has a non-zero distance from the playback screen, in a direction at least substantially perpendicular to the plane of the playback screen).

In a first class of embodiments, the invention is a method for rendering an audio program (e.g., an object based audio program), including steps of: (a) determining at least one warping degree parameter (e.g., by parsing the program to identify at least one said one warping degree parameter which is indicated by screen-related metadata of the program, or configuring a playback system to perform the rendering including by specifying at least one said one warping degree parameter to the playback system); and (b) performing warping on audio content of at least one channel of the program to a degree determined at least in part by the warping degree parameter corresponding to said channel, where each said warping degree parameter is indicative of (e.g., is a non-binary value indicative of) a maximum degree of warping to be performed on corresponding audio content of the program by a playback system. In some embodiments in the first class, step (a) includes a step of determining at least one off-screen warping parameter (e.g., by parsing the program to identify at least one said one off-screen warping parameter which is indicated by screen-related metadata of the program), where the off-screen warping parameter is indicative of at least one characteristic of off-screen warping on corresponding audio content of the program by a playback system, and wherein the warping performed in step (b) includes off-screen warping determined at least in part by at least one said off-screen warping parameter. For example, the off-screen warping parameter may control the manner or degree of warping or maximum warping (in a direction at least substantially parallel to the plane of a playback screen) of an audio element's warped position as a function of depth (distance from the playback screen in a direction at least substantially perpendicular to the plane of the playback screen). In some embodiments, the warping degree parameter determined in step (a) is indicative of a maximum degree of warping to be performed in a plane at least substantially parallel to the plane of a playback screen (at a depth at least substantially perpendicular to the playback screen) on corresponding audio content of the program, and thus is an off-screen warping parameter. In other embodiments, step (a) includes determining at least one warping degree parameter and also at least one off-screen warping parameter which is not a warping degree parameter. In some embodiments, the program is indicative of at least two objects, step (a) includes a step of independently determining at least one warping degree parameter for each of at least two of the objects, and step (b) includes a step of independently performing warping on audio content indicative of each of the objects to a degree determined at least in part by the at least one warping degree parameter which corresponds to said each of the objects.

In a second class of embodiments, the invention is a method for generating (or decoding) an object based audio program. The method includes steps of determining at least one warping degree parameter for at least one audio object, and including in the program an object channel (indicative of the object) and screen-related metadata indicative of each said warping degree parameter for the object. Each said warping degree parameter is indicative of (e.g., is a non-binary value (e.g., a scalar value which has any of many values in a predetermined range) indicative of) a maximum degree of warping to be performed (e.g., in a plane parallel to the plane of a playback screen) on the corresponding object by a playback system. For example, the warping degree parameter may be a floating point value in a range from a minimum value (indicating that no warping should be performed) to a maximum value indicating that full warping should be performed (e.g., to warp an audio element position defined by the program to be at the right edge of a reference screen, to a warped position at the right edge of the playback screen), where the range includes at least one intermediate value (greater than the minimum value but less than the maximum value) indicating that an intermediate degree of warping (e.g., 50% of full warping) should be performed (e.g., to warp an audio element position defined by the program to be at the right edge of a reference screen, to a warped position midway between the right edge of the playback room and the right edge of the playback screen). In this context, full warping may denote warping of perceived positions of audio elements in the plane of the playback screen so that the warped positions coincide with the playback screen, and an intermediate degree of warping (or less than full warping) may denote warping of perceived positions of audio elements in the plane of the playback screen so that the warped positions coincide with an area larger than (and including) the playback screen.

In some embodiments in the second class, the screen-related metadata is indicative of at least one said warping degree parameter for each of at least two objects of the program, each said warping degree parameter indicating a maximum degree of warping to be performed on each corresponding object. For example, the warping degree parameters could indicate a different maximum degree of warping, in or parallel to the plane of the playback screen, for each object indicated by a different object channel. For another example, the warping degree parameters could indicate a different maximum degree of warping in a vertical direction in or parallel to the plane of the playback screen, and a different maximum degree of warping in a horizontal direction in or parallel to the plane of the playback screen, for each object indicated by a different object channel).

In some embodiments in the second class, the screen-related metadata is also indicative of at least one off-screen warping parameter indicative of at least one characteristic of off-screen warping to be performed (e.g., indicative of a manner in which and/or a degree to which warping, in planes at least substantially parallel to the plane of the playback screen, is to be performed as a function of distance of each of the planes at least substantially perpendicular to the plane of the playback screen) on corresponding audio content of the program by a playback system. In some such embodiments, the screen-related metadata is indicative of one said off-screen warping parameter for each of at least two objects indicated by the program, each said off-screen warping parameter indicating at least one characteristic of off-screen warping to be performed on each corresponding object. For example, the program could include an off-screen warping parameter for each object indicated by a different object channel, indicating a type of off-screen warping to be performed on each corresponding object (i.e., the metadata could specify a different type of off-screen warping for the object(s) corresponding to each of the object channels). In some embodiments, at least one off-screen warping parameter is indicative of a maximum degree of warping to be performed in a plane at least substantially parallel to the plane of a playback screen (at a depth at least substantially perpendicular to the playback screen) on corresponding audio content of the program, and thus the off-screen warping parameter is a warping degree parameter.

In a third class of embodiments, the invention is a method including steps of:

(a) generating an object based audio program; and (b) in response to the object based audio program, generating a speaker channel-based program including at least one set of speaker channels intended for playback by loudspeakers positioned at predetermined locations relative to a playback screen, wherein generation of the set of speaker channels includes a step of warping audio content of the object based audio program to a degree determined at least in part by at least one warping degree parameter, and each said warping degree parameter is indicative of (e.g., is a non-binary value (e.g., a scalar value which has any of many values in a predetermined range) indicative of) a maximum degree of warping to be performed (e.g., in a plane parallel to the plane of the playback screen) on corresponding audio content of the object based audio program by a playback system.

In some embodiments in the third class, step (b) includes a step of generating the speaker channel-based audio program to include two or more selectable sets of speaker channels, at least one of the sets is indicative of unwarped audio content of the object based audio program, generation of at least one other one of the sets includes a step of warping audio content of the object based audio program (using the warping degree parameter), and said other one of the sets is intended for playback by loudspeakers positioned at the predetermined locations relative to the playback screen. In some embodiments in the third class, step (b) includes a step of determining at least one off-screen warping parameter (e.g., by parsing the object based program to identify at least one said off-screen warping parameter which is indicated by screen-related metadata of the object based audio program), where the off-screen warping parameter is indicative of at least one characteristic of off-screen warping on corresponding audio content of the object based audio program by a playback system, and wherein the warping performed in step (b) includes off-screen warping determined at least in part by at least one said off-screen warping parameter.

In some embodiments in the third class, the object based audio program includes screen-related metadata indicative of at least one said warping degree parameter (or at least one said warping degree parameter and at least one off-screen warping parameter), and step (b) includes a step of parsing the object based audio program to identify the at least one said warping degree parameter (or the at least one said warping degree parameter and the off-screen warping parameter).

The generation (by embodiments in the third class) of the speaker channel-based program supports screen-relative rendering by a playback system not configured to perform decoding and rendering of an object based audio program (but capable of decoding and rendering a speaker channel-based program). Typically, the speaker channel-based program is generated by a remixing system having knowledge of (or which assumes) a specific playback system speaker and screen configuration. Typically, the object based program (in response which the speaker channel-based program is generated) includes screen-related metadata which supports screen-relative rendering of the object based program by a suitably configured playback system (capable of decoding and rendering object based programs).

In a fourth class of embodiments, the invention is method of rendering a speaker channel-based program including at least one set of speaker channels indicative of warped content, wherein the speaker channel-based program has been generated by processing an object based audio program including by warping audio content of the object based audio program to a degree determined at least in part by at least one warping degree parameter, to generate the set of speaker channels indicative of warped content, where each said warping degree parameter is indicative of (e.g., is a non-binary value (e.g., a scalar value which has any of many values in a predetermined range) indicative of) a maximum degree of warping to be performed (e.g., in a plane parallel to the plane of a playback screen) on corresponding audio content of the object based audio program by a playback system, said method of rendering including steps of:

(a) parsing the speaker channel-based program to identify speaker channels of the speaker channel-based program, including each said set of speaker channels indicative of warped content; and (b) generating speaker feeds, for driving loudspeakers positioned at predetermined locations relative to a playback screen, in response to at least some of the speaker channels of the speaker channel-based program, including at least one said set of speaker channels indicative of warped content.

In some embodiments in the fourth class, the speaker channel-based program has been generated by processing the object based audio program including by performing off-screen warping of audio content of the object based audio program, to a degree determined at least in part by the at least one warping degree parameter, and using at least one off-screen warping parameter indicative of at least one characteristic of off-screen warping on corresponding audio content of the object based program.

In some embodiments in the fourth class, the speaker channel-based audio program includes two or more selectable sets of speaker channels, at least one of the sets is indicative of unwarped audio content of the object based audio program, and another one of the sets is one said set of speaker channels indicative of warped content, and step (b) includes a step of selecting one of the sets which is one said set of speaker channels indicative of warped content.

In some embodiments, the inventive method includes steps of generating (e.g., in an encoder), decoding (e.g., in a decoder), and/or rendering an object based audio program including screen-related metadata. The object based program has corresponding video content (e.g., it may be a soundtrack of a movie or other audiovisual program), and includes at least one audio object channel, screen-related metadata, and typically also speaker channels. The screen-related metadata includes metadata corresponding to each of at least one of the object channels (and optionally also metadata corresponding to each of at least one of the speaker channels). During rendering and playback of the object based program, processing of the screen-related metadata (typically with data indicative of relationship(s) between the speakers and screen of the playback system) allows dynamic warping of the perceived positions of on-screen audio elements (e.g., audio elements which the content creator intended to be perceived at predetermined locations on a movie screen during playback in a movie theater) so that the warped positions have predetermined sizes and positions relative to the actual sizes and locations of the playback system's display screen. The warped positions need not coincide with the actual display screen of the playback system, and typical embodiments of the invention allow smooth transitions between on- and off-screen perceived locations of audio elements whose positions vary during playback of a program.

In some embodiments, an object based audio program is generated, decoded, and/or rendered. The program includes at least one audio object channel and optionally also at least one speaker channel (e.g., a set or "bed" of speaker channels), each object channel is indicative of an audio object or set (e.g., mix or cluster) of audio objects, and at least one object channel has (e.g., includes) corresponding screen-related metadata. The bed of speaker channels may be a conventional mix (e.g., a 5.1 channel mix) of speaker channels of a type that might be included in a conventional speaker channel-based broadcast program which does not include an object channel. The method may include a step of encoding audio data indicative of each said object channel (and optionally also the set of speaker channels) to generate the object based audio program. In response to an object based audio program generated by typical embodiments in this class, a rendering step may generate speaker feeds which are indicative of a mix of audio content of each speaker channel and each object channel.

Aspects of the invention include a system or device configured (e.g., programmed) to implement any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

In a class of embodiments, the invention is a system configured to generate an object based audio program indicative of at least one audio object channel (typically a set of object channels) and at least one speaker channel (typically a set of speaker channels). Each audio object channel is indicative of an object or set (e.g., mix or cluster) of objects, and typically includes corresponding object-related metadata. The set of speaker channels may be a conventional mix (e.g., a 5.1 channel mix) of speaker channels of a type that might be included in a conventional speaker channel-based broadcast program which does not include an object channel. In response to an object based audio program generated by typical embodiments of the system, a spatial rendering subsystem may generate speaker feeds which are indicative of a mix of audio content of the speaker channels and each object channel.

In a class of embodiments, the invention is an audio processing unit (APU) including a buffer memory (buffer) which stores (e.g., in a non-transitory manner) at least one frame or other segment (including audio content) of an audio program which has been generated by any embodiment of the inventive method. Where the program is an object based audio program, the segment stored typically includes audio content of a bed of speaker channels and of object channels, and corresponding screen-related metadata. In another class of embodiments, the invention is an APU including a buffer memory (buffer) which stores (e.g., in a non-transitory manner) at least one frame or other segment of a speaker channel-based audio program, where the segment includes audio content of at least one set of speaker channels generated as a result of performing warping of audio content of an object based audio program in accordance with an embodiment of the invention. The segment may include audio content of at least two selectable sets of speaker channels of the speaker channel-based program, where at least one of the sets is generated as a result of warping in accordance with an embodiment of the invention.

Typical embodiments of the inventive system are configured to implement real-time creation of an encoded, object based audio bitstream for transmission (or delivery in another manner) to an external rendering system (e.g., device).

NOTATION AND NOMENCLATURE

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expressions "audio processor" and "audio processing unit" are used interchangeably, and in a broad sense, to denote a system configured to process audio data. Examples of audio processing units include, but are not limited to encoders (e.g., transcoders), decoders, codecs, pre-processing systems, post-processing systems, and bitstream processing systems (sometimes referred to as bitstream processing tools).

Throughout this disclosure including in the claims, the expression "metadata" (e.g., as in the expression "screen-related metadata") refers to separate and different data from corresponding audio data (audio content of a bitstream which also includes metadata). Metadata is associated with audio data, and indicates at least one feature or characteristic of the audio data (e.g., what type(s) of processing have already been performed, or should be performed, on the audio data, or the trajectory of an object indicated by the audio data). The association of the metadata with the audio data is time-synchronous. Thus, present (most recently received or updated) metadata may indicate that the corresponding audio data contemporaneously has an indicated feature and/or comprises the results of an indicated type of audio data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:

speaker and loudspeaker are used synonymously to denote any sound-emitting transducer. This definition includes loudspeakers implemented as multiple transducers (e.g., woofer and tweeter);

speaker feed: an audio signal to be applied directly to a loudspeaker, or an audio signal that is to be applied to an amplifier and loudspeaker in series;

channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;

audio program: a set of one or more audio channels (at least one speaker channel and/or at least one object channel) and optionally also associated metadata (e.g., metadata that describes a desired spatial audio presentation);

speaker channel (or "speaker-feed channel"): an audio channel that is associated with a named loudspeaker (at a desired or nominal position), or with a named speaker zone within a defined speaker configuration. A speaker channel is rendered in such a way as to be equivalent to application of the audio signal directly to the named loudspeaker (at the desired or nominal position) or to a speaker in the named speaker zone;

object channel: an audio channel indicative of sound emitted by an audio source (sometimes referred to as an audio "object"). Typically, an object channel determines a parametric audio source description (e.g., metadata indicative of the parametric audio source description is included in or provided with the object channel). The source description may determine sound emitted by the source (as a function of time), the apparent position (e.g., 3D spatial coordinates) of the source as a function of time, and optionally at least one additional parameter (e.g., apparent source size or width) characterizing the source;

object based audio program: an audio program comprising a set of one or more object channels (and optionally also comprising at least one speaker channel) and optionally also associated metadata (e.g., metadata indicative of a trajectory of an audio object which emits sound indicated by an object channel, or metadata otherwise indicative of a desired spatial audio presentation of sound indicated by an object channel, or metadata indicative of an identification of at least one audio object which is a source of sound indicated by an object channel); and render: the process of converting an audio program into one or more speaker feeds, or the process of converting an audio program into one or more speaker feeds and converting the speaker feed(s) to sound using one or more loudspeakers (in the latter case, the rendering is sometimes referred to herein as rendering "by" the loudspeaker(s)). An audio channel can be trivially rendered ("at" a desired position) by applying the signal directly to a physical loudspeaker at the desired position, or one or more audio channels can be rendered using one of a variety of virtualization techniques designed to be substantially equivalent (for the listener) to such trivial rendering. In this latter case, each audio channel may be converted to one or more speaker feeds to be applied to loudspeaker(s) in known locations, which are in general different from the desired position, such that sound emitted by the loudspeaker(s) in response to the feed(s) will be perceived as emitting from the desired position. Examples of such virtualization techniques include binaural rendering via headphones (e.g., using Dolby Headphone processing which simulates up to 7.1 channels of surround sound for the headphone wearer) and wave field synthesis.

DETAILED DESCRIPTION OF EMBODIMENTS OF THE INVENTION

Examples of embodiments of the inventive system (and methods performed by the system) will be described with reference to FIGS. 3, 4, and 5.

Figure 3:
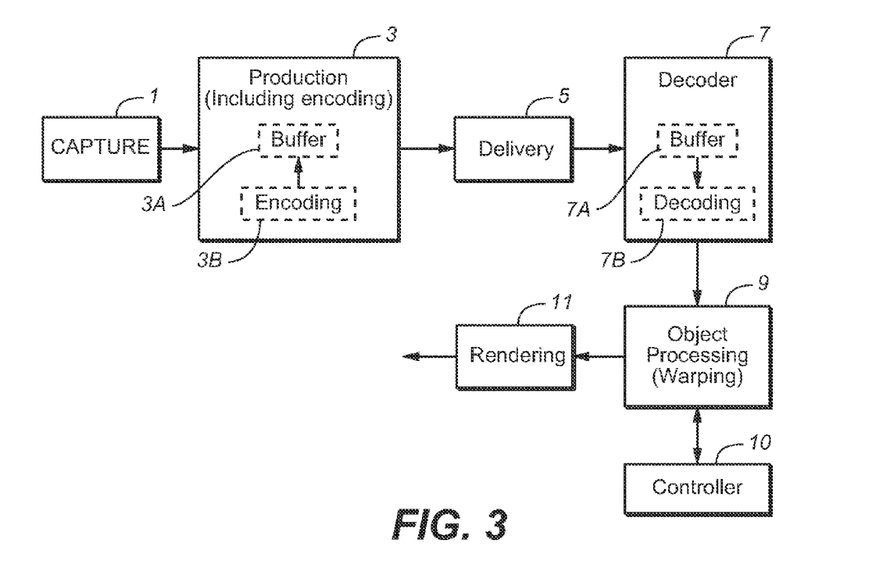
FIG. 3 is a block diagram of an embodiment of a system configured to perform an embodiment of the inventive method.

FIG. 3 is a block diagram of an example of an audio processing pipeline (an audio data processing system), in which one or more of the elements of the system are configured in accordance with an embodiment of the present invention. The system includes the following elements, coupled together as shown: capture unit 1, production unit 3 (which includes an encoding subsystem), delivery subsystem 5, decoder 7, object processing subsystem 9, controller 10, and rendering subsystem 11. In variations on the system shown, one or more of the elements are omitted, or additional audio data processing units are included. Typically, elements 7, 9, 10, and 11 are included in a playback system (e.g., the end user's home theater system).

Capture unit 1 is typically configured to generate PCM (time-domain) samples comprising audio content, and to output the PCM samples. The samples may be indicative of multiple streams of audio captured by microphones. Production unit 3 is configured to accept the PCM samples as input and to generate an object based audio program indicative of the audio content. The program typically is or includes an encoded (e.g., compressed) audio bitstream. The data of the encoded bitstream that are indicative of the audio content are sometimes referred to herein as "audio data." If the encoding subsystem of production unit 3 is configured in accordance with a typical embodiment of the present invention, the object based audio program generated by unit 3 is indicative of (i.e., includes) multiple speaker channels (a "bed" of speaker channels) of audio data, multiple object channels of audio data, and metadata (including screen-related metadata corresponding to each of the object channels and optionally also screen-related metadata corresponding to each of the speaker channels).

In a typical implementation, unit 3 is configured to output the object based audio program generated therein.

In another implementation, unit 3 includes a remixing subsystem coupled and configured to generate a speaker channel-based audio program (comprising speaker channels but not object channels) in response to the object based audio program, and unit 3 is configured to output the speaker channel-based audio program. Remixing subsystem 6 of the FIG. 5 system is another example of a remixing subsystem coupled and configured to generate a speaker channel-based audio program (program "SP, which comprises speaker channels but not object channels) in accordance with an embodiment of the invention, in response to an object based audio program ("OP") generated by encoder 4 (of FIG. 5) in accordance with an embodiment of the invention.

Delivery subsystem 5 of FIG. 3 is configured to store and/or transmit (e.g., broadcast) the program generated by and output from unit 3 (e.g., an object based audio program, or a speaker channel-based audio program generated in response to an object based audio program). For simplicity, we will describe (and refer to) the FIG. 3 system with the assumption that the program generated by and output from unit 3 is an object based audio program (unless it is clear from the context that the description or reference that the program generated by and output from unit 3 is a speaker channel-based audio program.

In typical embodiments of the FIG. 3 system, subsystem 5 implements delivery of an object based audio program to decoder 7. For example, subsystem 5 may be configured to store the program (e.g., on a disc) and provide the stored program to decoder 7. Alternatively, subsystem 5 may be configured to transmit the program (e.g., over a broadcast system, or an Internet Protocol or other network) to decoder 7.

Decoder 7 is coupled and configured to accept (receive or read) the program delivered by delivery subsystem 5, and to decode the program. If the program is an object based program, and decoder 7 is configured in accordance with a typical embodiment of the present invention, the output of decoder 7 in typical operation includes the following:

streams of audio samples indicative of the program's bed of speaker channels (and optionally also corresponding streams of screen-related metadata); and streams of audio samples indicative of object channels of the program and corresponding streams of screen-related metadata.

Object processing subsystem 9 is coupled to receive (from decoder 7) decoded speaker channels, object channels, and screen-related metadata of the delivered program. Subsystem 9 is coupled and configured to perform warping on the object channels (or on a selected subset of the object channels, or on at least one mix (e.g., cluster) of some or all of the object channels) using the screen-related metadata, and to output to rendering subsystem 11 the resulting object channels and/or mixes. Subsystem 9 typically also outputs to rendering subsystem 11 object-related metadata (which has been parsed by decoder 7 from the program delivered by subsystem 5, and asserted from decoder 7 to subsystem 9) corresponding to the object channels and/or mixes which it outputs to subsystem 11. Subsystem 9 is typically also configured to pass through unchanged (to subsystem 11) the decoded speaker channels from decoder 7.

In the case that the program delivered to decoder 7 is a speaker channel-based audio program (generated from an object based program in accordance with an embodiment of the invention), subsystem 9 may be implemented as (e.g., replaced by) a simple speaker channel selection system configured to implement warping in accordance with the invention by selecting some of the speaker channels of the program (in a manner to be described in more detail below) and asserting the selected channels to rendering subsystem 11.

The warping performed by subsystem 9 may be controlled at least in part by data asserted to subsystem 9 from controller 10 (e.g., in response to user operation of controller 10 during set-up of the system). Such data may be indicative of characteristics of playback system speakers and display screen (e.g., may be indicative of relative size and positions of a playback system screen and playback system speakers), and/or it may include least one warping degree parameter and/or at least one off-screen warping parameter. The warping performed by subsystem 9 is typically determined at least in part by at least one warping degree parameter and/or at least one off-screen warping parameter indicated by screen-relative metadata of the program (delivered to decoder 7) and/or at least one warping degree parameter and/or at least one off-screen warping parameter asserted from controller 10 to subsystem 9.

Rendering subsystem 11 of FIG. 3 is configured to render the audio content determined by the output of subsystem 9, for playback by the speakers (not shown) of the playback system. Subsystem 11 is configured to map, to the available speaker channels, the audio objects determined by the object channels (or mixes) output from subsystem 9, using rendering parameters output from subsystem 9 (e.g., values of spatial position and level indicated by object-related metadata output from subsystem 9). Rendering system 11 also receives any bed of speaker channels which has been passed through by subsystem 9. Typically, subsystem 11 is an intelligent mixer, and is configured to determine speaker feeds for the available speakers including by mapping one or more objects (or mixes) to each of a number of individual speaker channels, and mixing the objects (or mixes) with "bed" audio content indicated by each corresponding speaker channel of the program's speaker channel bed.

Typically, the output of subsystem 11 is a set of speaker feeds which are asserted to playback system loudspeakers (e.g., the speakers shown in FIG. 4) to drive the speakers.

An aspect of the invention is an audio processing unit (APU) configured to perform any embodiment of the inventive method. Examples of APUs include, but are not limited to encoders (e.g., transcoders), decoders, codecs, pre-processing systems (pre-processors), post-processing systems (post-processors), audio bitstream processing systems, and combinations of such elements. Examples of APUs are production unit 3, decoder 7, object processing subsystem 9, and rendering subsystem 11 of FIG. 3. Implementations of all these exemplary APUS which are configured to perform an embodiment of the inventive method are contemplated and described herein.

In a class of embodiments, the invention is an APU including a buffer memory (buffer) which stores (e.g., in a non-transitory manner) at least one frame or other segment (including audio content) of an audio program which has been generated by any embodiment of the inventive method. Where the program is an object based audio program, the segment stored typically includes audio content of a bed of speaker channels and of object channels, and corresponding screen-related metadata. An example of such an APU is an implementation of production unit 3 of FIG. 3 which includes encoding subsystem 3B (configured to generate an object based audio program in accordance with an embodiment of the invention), and buffer 3A coupled to subsystem 3B, where buffer 3A stores (e.g., in a non-transitory manner) at least one frame or other segment (including audio content of a bed of speaker channels and of object channels, and corresponding screen-related metadata) of the object based audio program. Another example of such an APU is an implementation of decoder 7 of FIG. 3 which includes buffer 7A, which stores (e.g., in a non-transitory manner) at least one frame or other segment (including audio content of a bed of speaker channels and of object channels, and corresponding screen-related metadata) of an object based audio program delivered from subsystem 5 to decoder 7, and decoding subsystem 7B (coupled to buffer 7A) which is configured to parse and perform any necessary decoding on the program.

In another class of embodiments, the invention is an APU including a buffer memory (buffer) which stores (e.g., in a non-transitory manner) at least one frame or other segment of a speaker channel-based audio program, where the segment includes audio content of at least one set of speaker channels generated as a result of performing warping of audio content of an object based audio program in accordance with an embodiment of the invention. The segment may include audio content of at least two selectable sets of speaker channels of the speaker channel-based program, where at least one of the sets is generated as a result of warping in accordance with an embodiment of the invention.

An example of such an APU is an implementation of production unit 3 of FIG. 3 which includes encoding subsystem 3B (configured to generate a speaker channel-based audio program in accordance with an embodiment of the invention, including by performing warping on audio content of an object based audio program also generated by unit 3), and buffer 3A coupled to subsystem 3B, where buffer 3A stores (e.g., in a non-transitory manner) at least one frame or other segment (including audio content of at least two selectable sets of speaker channels, where at least one of the sets is generated as a result of performing warping in accordance with an embodiment of the invention on audio content of the object based audio program) of the speaker channel-based audio program. Another example of such an APU is an implementation of decoder 7 of FIG. 3 which includes buffer 7A, where buffer 7A stores (e.g., in a non-transitory manner) at least one frame or other segment of the speaker channel-based audio program generated by the exemplary embodiment of unit 3 which has been delivered from unit 3 via subsystem 5 to decoder 7, and decoding subsystem 7B (coupled to buffer 7A) which is configured to parse and perform any necessary decoding on the program. Another example of such an APU is an implementation of remixing subsystem 6 of FIG. 5 which includes audio processing subsystem 6B (configured to generate a speaker channel-based audio program in accordance with an embodiment of the invention, including by performing warping on audio content of an object based audio program, which typically includes screen-related metadata, generated by encoder 4 of FIG. 5) and buffer 6A coupled to subsystem 6B, where buffer 6A stores (e.g., in a non-transitory manner) at least one frame or other segment (including audio content of at least two selectable sets of speaker channels, where at least one of the sets is generated as a result of warping in accordance with an embodiment of the invention) of the speaker channel-based audio program generated by subsystem 6B.

Typical embodiments of the invention assume that the playback environment is a unit cube with width along an "x" axis, depth along a "y" axis (perpendicular to the "x" axis) and height along a "z" axis (perpendicular to each of the "x" axis and "y" axis). The positions at which audio elements (sound sources) indicated by an audio program (i.e., audio objects indicated by object channels or sound sources indicated by speaker channels) are rendered are identified in this unit cube using Cartesian coordinates (x,y,z) with each of the x and y coordinates having range in the interval [0,1]. For example, FIG. 4 is a diagram of a playback environment (a room) including a display screen (playback screen S') and speakers (L', C', R', Ls, and Rs) of a playback system. Playback screen S' of FIG. 4 has width "W1" along the "x" axis, and its center is positioned along the central vertical axis of the room's front wall (the plane in which y=0). The room's rear wall (which has width "W2") is the plane in which y=1. Front speakers L', C', and R' are positioned near the room's front wall, left surround speaker Ls is positioned near the room's left wall (the plane in which x=0), and right surround speaker Rs is positioned near the room's right wall (the plane in which x=1).

Typically, the z coordinate of the playback environment is assumed to have a fixed value (nominally corresponding to the ear level of a user of the playback system). Alternatively, to render objects (or other sound sources) at positions which are perceived to be below or above ear level, the z coordinate of the rendering position can be allowed to vary (e.g., over the interval [−1,1], if the room is assumed to have width equal to 1, depth equal to 1, and height equal to 2).

In some embodiments, screen parameterization and/or warping are accomplished using all or some of the following parameters (which may be determined during authoring and/or encoding, and indicated by screen-related metadata of the delivered program):

audio element (e.g., object) position relative to a reference screen;

Degree of on-screen warping (e.g., a parameter indicative of a maximum degree of warping to be performed in, or parallel to, the plane of the playback screen). It is contemplated that authoring may typically specify warping as a binary decision, and that an encoding process may modify the binary decision to a continuous (or nearly continuous) variable ranging from no warping to full (maximum) warping;

Desired off-screen warping (e.g., one or more parameters indicative of a manner in which or the degree to which warping, in planes at least substantially parallel to the plane of the playback screen, is to be performed as a function of distance at least substantially perpendicular to the plane of the playback screen). Authoring could define parameter(s) indicating the manner in which, or the degree to which, warping is to be performed as an audio element's perceived warped position moves off the playback screen in a direction perpendicular to the playback screen plane. In some cases, such parameter(s) would not be delivered with the program (and could instead be determined by the playback system);

Reference screen width relative to reference room (or relative to reference L/R speakers used during authoring). Typically this parameter is equal to 1.0 for cinema (i.e., for audiovisual programs authored for playback in cinemas); and Reference screen center position relative to reference room (or relative to reference L/R speakers used during authoring). Typically, this parameter is equal to (0.5,0, 0.5) for cinema.

In some embodiments, screen parameterization and/or warping are accomplished using all or some of the following parameters (which are typically determined by the playback system, e.g., during home theater set-up):

Playback screen width relative to playback room (or relative to playback system L/R speakers). For example, this parameter may have a default value of 1.0 (e.g., if the end user does not specify playback screen size, the playback system assumes that the playback screen matches the playback room width, which will effectively disable warping);

Desired off-screen warping (e.g., one or more parameters indicative of a manner in which or the degree to which warping, in planes at least substantially parallel to the plane of the playback screen, is to be performed as a function of distance at least substantially perpendicular to the plane of the playback screen). In some embodiments, the playback system (e.g., the controller 10 of the FIG. 3 embodiment) is configured to enable custom settings which indicate the manner in which, or the degree to which, warping is to be performed as a function of distance of an audio element's perceived warped position from the playback screen plane (in a direction at least substantially perpendicular to the playback screen plane). It is expected that typical embodiments, screen-related metadata of the program will be indicative of (i.e., will include at least one off-screen warping parameter indicative of) a fixed function, or a default function (which could be replaced by a user-specified alternative function, e.g., during playback system set-up), determining at least in part the manner in which warping is to be performed as a function of distance of an audio element's perceived warped position from the plane of the playback screen;

Playback screen aspect ratio (e.g., with a default value of 1.0); and

Playback screen center position (e.g., with a default value of (0.5,0,0.5)).

In some embodiments, warping is accomplished using other parameters (instead of or in addition to some or all of the above-mentioned parameters), which may be indicated by screen-related metadata of a delivered program. For example, for each channel (object channel or speaker channel) of the program (or each of some of the program's channels), one or more of the following parameters could be provided:

1. warping enable. This parameter indicates whether or not processing should be performed to warp the perceived position of at least one audio element determined by the channel. This parameter would typically be a binary value which indicates that warping should be or should not be performed). An example is the "apply_screen_warping" value mentioned below;

2. degree of warping (e.g., one or more floating point values, each having any of many different values in the range [0,1] or another predetermined range, or one or more other non-binary parameters). Such warping degree parameter(s) would typically modify a function which controls warping from positions in (or parallel to) the plane of a reference screen to positions in (or parallel to) the plane of a playback screen, to determine a maximum degree of warping to be performed in (or parallel to) the plane of a playback screen. The warping degree parameter (or parameter set) could be different for warping along (or parallel to) the axis (e.g., the "x" axis) along which the playback screen has width and along (or parallel to) the axis (e.g., the "z" axis) along which the playback screen has height;

3. depth warping (e.g., one or more parameters, each having any floating point value in a predetermined range [1,N], e.g., N=2). Such parameter(s) (sometimes referred to herein as "off-screen warping parameter(s)) would typically modify a function that controls the warping of off-screen audio elements, to control the degree of warping or maximum warping of audio element rendering position as a function of distance (depth) from the plane of the playback screen. For example, such a parameter could control the degree of warping (at least substantially parallel to the plane of the playback screen) of a sequence of rendering positions of an audio element which is intended to be perceived as "flying" from a playback screen (at the front of a playback room) to the back of the playback room or vice-versa.

For example, in a class of embodiments warping is accomplished using screen-related metadata included in an audio program (e.g., an object based audio program), where the screen-related metadata is indicative of at least one non-binary value (e.g., a scalar value continuously variable or having any of many values in a predetermined range) which indicates a maximum degree of warping to be performed by a playback system (e.g., a maximum degree of warping to be performed in, or parallel to, the plane of a playback screen). For example, the non-binary value may be a floating point value in a range from a maximum value (indicating that full warping should be performed, e.g., to warp an audio element position defined by the program to be at the right edge of a reference screen, to a warped position at the right edge of the playback screen) to a minimum value (indicating that no warping should be performed). In the example, a non-binary value in the midpoint of the range, may indicate that half warping (50% warping) should be performed (e.g., to warp an audio element position defined by the program to be at the right edge of a reference screen, to a warped position midway between the right edge of the playback room and the right edge of the playback screen).

In some embodiments in the class, the program is an object based audio program including such metadata for each object channel of the program, said metadata indicating a maximum degree of warping to be performed on each corresponding object. For example, the metadata could indicate a different maximum degree of warping, in or parallel to the plane of the playback screen, for each object indicated by a different object channel. For another example, the metadata could indicate a different maximum degree of warping in a vertical direction (e.g., parallel to the "z" axis of FIG. 4) in or parallel to the plane of the playback screen, and a different maximum degree of warping in a horizontal direction (e.g., parallel to the "x" axis of FIG. 4) in or parallel to the plane of the playback screen, for each object indicated by a different object channel).

In some embodiments in the class, the audio program also includes (and warping is accomplished using) screen-related metadata indicative of at least one characteristic of off-screen warping (e.g., indicative of a manner in which or the degree to which warping, in planes at least substantially parallel to the plane of the playback screen, is to be performed as a function of distance at least substantially perpendicular to the plane of the playback screen). In some such embodiments, the program is an object based audio program including such metadata for each object channel of the program, said metadata indicating at least one characteristic of off-screen warping to be performed on each corresponding object. For example, the program could include such metadata for each object channel, indicating a type of off-screen warping to be performed on each corresponding object (i.e., the metadata could specify a different type of off-screen warping for the object corresponding to each of the object channels).

We next describe examples of methods of processing audio programs to implement warping in accordance with embodiments of the invention.

In the exemplary methods, screen-related metadata of an audio program includes at least one warping degree parameter having a non-binary value (for each channel whose audio content is to be warped) which indicates a maximum degree of warping to be performed by a playback system to at least one audio element indicated by the channel in, or parallel to, the plane of a playback screen, so that audio elements which the program indicates should be rendered at positions relative to a reference screen (and in the plane of the reference screen) are rendered at warped positions relative to a playback screen (and in the plane of the playback screen). Preferably, one or two such warping degree parameters are included for each channel: one (e.g., the value "XFACTOR" described below) indicative of a warping factor controlling how much warping is to be applied (i.e., the maximum degree of warping to be applied) to at least one audio element indicated by the channel in a horizontal direction (e.g., along the "x" axis of FIG. 4), and/or one indicative of a warping factor controlling how much warping is to be applied (i.e., the maximum degree of warping to be applied) to at least one audio element indicated by the channel in a vertical direction (e.g., along the "z" axis of FIG. 4). The program's screen-related metadata is also indicative of an off-screen warping parameter (e.g., the value "EXP" described below) for each channel, which controls at least one characteristic of off-screen warping to be performed as a function of distance (of warped position of a corresponding audio element) perpendicular to the plane of the playback screen. For example, the off-screen warping parameter may control the manner or degree of warping or maximum warping of an audio element's warped position as a function of depth (distance along the "y" axis of FIG. 4) perpendicular to the plane of the playback screen.

In the exemplary embodiments, the program's screen-related metadata also includes a binary value (to be referred to herein as "apply_screen_warping") for the program (or each of a sequence of segments of the program). If the value of "apply_screen_warping" (for the program or a segment thereof) indicatives "off," then no warping is applied by the playback system to the corresponding audio content. Warping can be so disabled, for example, for audio content that should be rendered with perceived positions in the plane of the playback screen (or which coincide with the playback screen) but which do not need to be tightly coupled to visuals (e.g., audio content which is music or ambiance). If the value of "apply_screen_warping" (for the program or a segment thereof) indicatives "on," then the playback system applies warping to the corresponding audio content as follows. The parameter, "apply_screen_warping," is not an example of a "warping degree" parameter of the type used and/or generated in accordance with the invention.

The following description assumes that the program is an object based program, and that each channel to undergo warping is an object channel indicative of an audio object having an unwarped position (which may be a time varying position) determined by the program. It will be apparent to those of ordinary skill in the art how to modify the description to implement warping of speaker channels of a program, where the speaker channels are indicative of at least one audio element having an unwarped position (which may be a time varying position) determined by the program. The following description also assumes that the playback environment is as shown in FIG. 4, and that the playback system is configured to generate five speaker feeds (for speakers L', C', R', Ls, and Rs as shown in FIG. 4) in response to the program.

In the exemplary embodiment, the playback system (e.g., subsystem 9 of the FIG. 3 system) determines from the program (e.g., from screen-related metadata of the program) the following value which indicates unwarped position of an object (to be rendered at a warped position to be determined by the playback system):

$$Xs = (x - RefSXcenterpos)/RefSWidth,$$

where "x" is the unwarped object position along a horizontal ("x" or "width") axis relative to the left edge of a reference screen, RefSXcenterpos is the position of the reference screen's center point along the horizontal axis, and RefSWidth is the width of the reference screen (along the horizontal axis).

The playback system (e.g., subsystem 9 of the FIG. 3 system) is configured to generate the following values, using screen-related metadata of the program (and other data indicative of playback system configuration):

$$Xwarp = Xs*SWidth + SXcenterpos,$$

$$YFACTOR = y^{EXP}, \text{ and}$$

$$X' = x*YFACTOR + (1 - YFACTOR)* [XFACTOR*Xwarp + (1 - XFACTOR)*x)],$$

where "Xwarp" denotes raw (un-scaled) warped object position along a horizontal ("x" or "width") axis relative to the left edge of the playback system display screen ("playback screen"), Xs is the warped object position along the horizontal axis relative to the playback screen's center point, SXcenterpos is the position of the playback screen's center point along the horizontal axis, and SWidth is the width of the playback screen (along the horizontal axis); and where "YFACTOR" is a depth warping factor which indicates degree of warping along the horizontal (width) axis as a function of position along a depth axis (the "y" axis of FIG. 4) perpendicular to the plane of the playback screen, "y" is the warped object position along the depth axis, and EXP is a predetermined (e.g., user-selected) constant which is an example of an "off-screen warping" parameter referred to herein; and where X' denotes the warped object position (a scaled version of the raw warped object position Xwarp) along the horizontal axis relative to the left edge of the playback screen (thus, the warped object position in a horizontal plane of the playback environment is the point having coordinates X', y), and XFACTOR is a width axis warping parameter (which may be determined during authoring, mixing, remixing, or encoding of the program) indicated by screen-related metadata of the program. XFACTOR is an example of a "warping degree" parameter referred to herein.

Warping of an unwarped object position (determined by the program) along a vertical ("z" or "height") axis, to a warped position along the vertical axis relative to a playback screen can be performed in a manner determined by trivial modification of the above equations (to replace references to a horizontal or "x" axis with references to vertical or "z" axis), taking into account the reference screen aspect ratio and playback screen aspect ratio.

The parameter XFACTOR has a value in the range from 0 to 1, inclusive (i.e., it has one of at least three values, and typically one of many values, in this range). The value of XFACTOR controls the degree to which warping is applied along the horizontal axis. If XFACTOR=1, full warping is performed along the horizontal axis (so that if the unwarped position of an object is off the playback screen, the warped position is on the playback screen). If XFACTOR=½ (or another value less than 1), a reduced amount of warping is performed along the x-axis (so that if the unwarped position of an object is far off the playback screen, e.g., at the position of the left front playback speaker, the warped position may also be off the playback screen, e.g., midway between the left front speaker and the left edge of the playback screen). It can be useful to set XFACTOR to a value less than 1 but greater than zero for a variety of reasons, e.g., in the case that warping is desired but full warping to a small playback screen is deemed undesirable, or in the case that audio object position is only loosely coupled with display screen size (e.g., for diffuse sound sources).

The parameter YFACTOR is used to control the degree of warping (along the horizontal axis and/or the vertical axis) as a function of the audio object's warped position along the depth axis, and the value of parameter YFACTOR is a function of the object's warped position along the depth axis. In the above example, this function is an exponential function. Other functions, which are variations on or otherwise different from the exemplary exponential function, are employed in alternative embodiments to determine "YFACTOR" (e.g., "YFACTOR" may be the cosine, or a power of the cosine, of the warped object position "y" along the depth axis). In the above example in which $YFACTOR = y^{EXP}$, when "EXP" is greater than zero (as is expected to be a typical choice), the degree of warping (in the "x" and/or "z" direction(s) perpendicular to the depth axis) of sound having an unwarped position at the front of the playback room (i.e., on the playback screen) is greater than the degree of warping (in direction(s) perpendicular to the depth axis) of sound having an unwarped position far from the front of the room (e.g., at the rear wall of the playback room). If "EXP" is greater than zero and y=0 (i.e., if the object's warped and unwarped positions are in the plane of the playback screen at the front of the playback room), then YFACTOR=0 and the warped position (X') along the horizontal "width" axis is determined by the unwarped position (x) along the width axis and the parameters XFACTOR and Xwarp. If "EXP" is greater than zero and y=1 (i.e., if the object's warped and unwarped positions are at the rear of the playback room), then YFACTOR=1 and the warped position (X') along the horizontal "width" axis is equal to the unwarped position (x) along the width axis, so that effectively no warping would be performed (along the width axis) on the object in this case.

Figure 4:
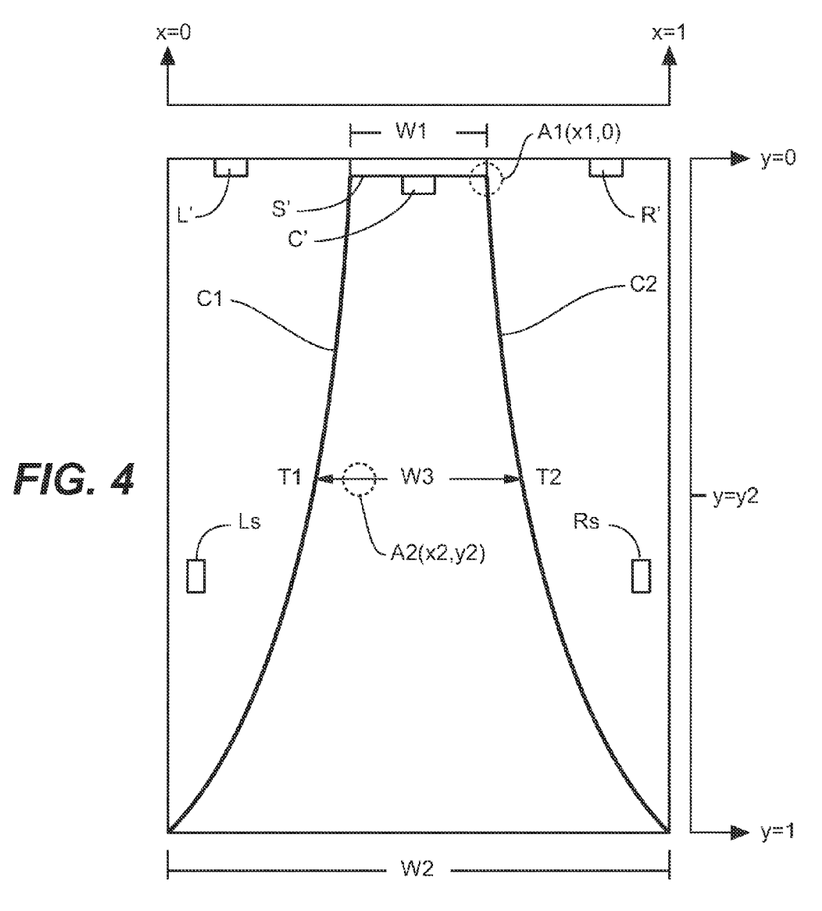
FIG. 4 is a diagram of a playback environment, including a display screen (playback screen S') and speakers (L', C', R', Ls, and Rs) of a playback system.

For a more specific example, audio object "A1" of FIG. 4 has an unwarped position (and thus a warped position) in the plane of playback screen S' at the front of the playback room (i.e., y=y1=0). If "EXP" is greater than zero, then YFACTOR=0 for performing horizontal axis warping on object A1, and the warping places object A1's warped position at some location X'=x1, y=0 (e.g., as shown in FIG. 4) coinciding with the playback screen S'. Audio object "A2" of FIG. 4 has an unwarped position (and thus a warped position) between the front and rear walls of the playback room (at 0<y2<1). If "EXP" is greater than zero, then YFACTOR is greater than zero for performing horizontal axis warping on object A2, and the warping places object A2's warped position at some location X'=x2, y=y2 (e.g., as shown in FIG. 4) along the line segment between points T1 and T2. The separation between points T1 and T2 is W3 (as indicated in FIG. 4), and since EXP is greater than zero, W3 satisfies W1<W3<W2, where W1 is the width of screen S' and W2 is the width of the playback room. The specific value of EXP determines the value of W3, which is the width range within which the warping can map an object at depth y=y2 relative to playback screen S'. If "EXP" is greater than one, then the warping places object A2's warped position at a location between curves C1 and C2 (shown in FIG. 4), where the separation (W3) between curves C1 and C2 is an exponentially increasing function of the depth parameter y (as shown in FIG. 4), with the separation, W3, increasing more rapidly (with increasing value of y) when y has greater values and increasing less rapidly (with increasing value of y) when y has smaller values.

Figure 4A:
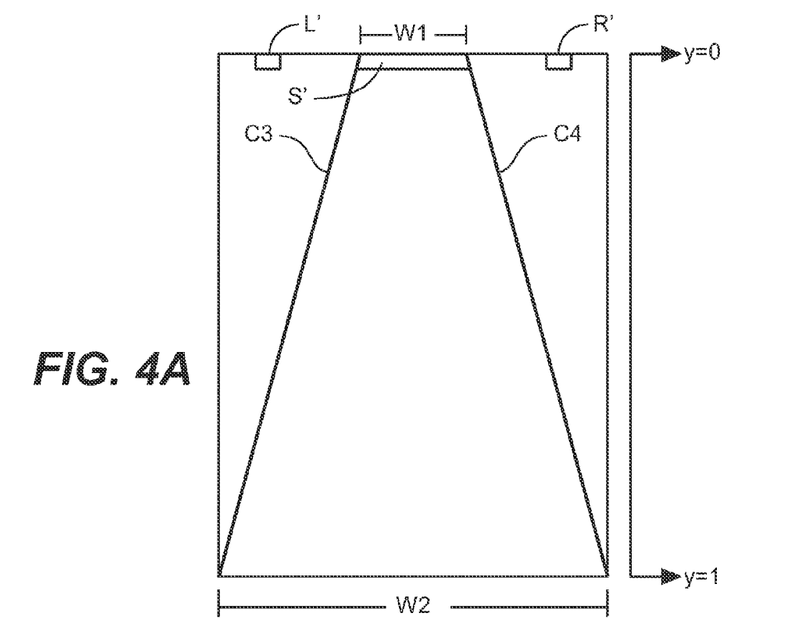
FIG. 4A is a diagram of the playback environment of FIG. 4, which illustrates an embodiment in which the parameter "EXP" has a different value than in an embodiment described with reference to FIG. 4.
Figure 4B:
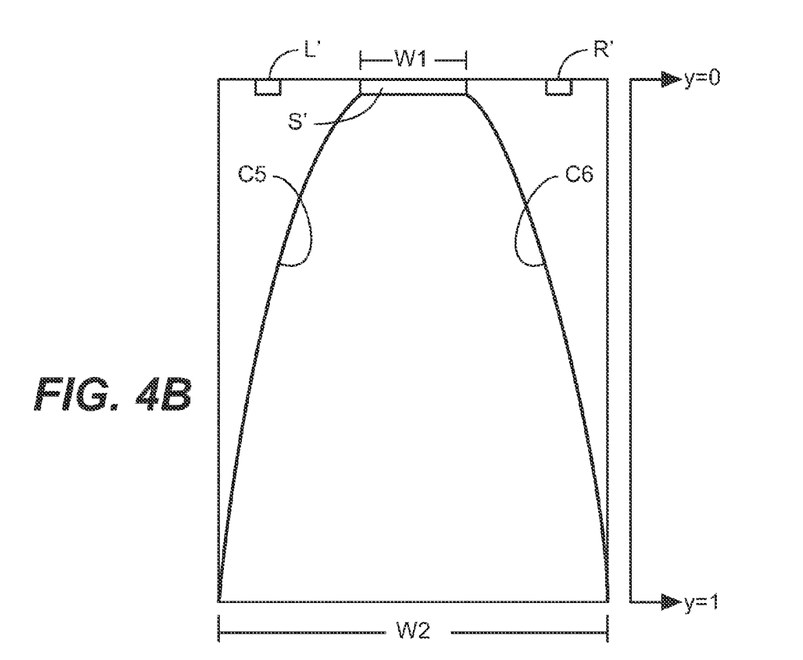
FIG. 4B is a diagram of the playback environment of FIG. 4, which illustrates an embodiment in which the parameter "EXP" has a different value than in embodiments described with reference to FIGS. 4 and 4A.

In other embodiments (to be described with reference to FIG. 4A) which are variations on the exemplary embodiment described with reference to curves C1 and C2 of FIG. 4, "EXP" is equal to one, so that the warping places object A2's warped position at a location between two curves (e.g., curves C3 and C4 in FIG. 4A), where the separation between curves C3 and C4 is a linearly increasing function of the depth parameter y. In other embodiments (to be described with reference to FIG. 4B) which are variations on the exemplary embodiment described with reference to curves C1 and C2 of FIG. 4, "EXP" is greater than zero but less than one, so that the warping places object A2's warped position at a location between two curves (e.g., curves C5 and C6 in FIG. 4B), where the separation between the curves is a logarithmically increasing function of the depth parameter y (as shown in FIG. 4B), with the separation between the curves increasing more rapidly (with increasing value of y) when y has smaller values and increasing less rapidly (with increasing value of y) when y has greater values. Embodiments in which EXP is equal to or less than one are expected to be typical, since in such embodiments the warping effect decreases more quickly with increasing value of y (i.e., with increasing warped position distance from the screen) than in the case that EXP is greater than one. When EXP is less than one, the warping effect decreases quickly as warped position begins to move away from the screen, and then decreases progressively more slowly as warped position moves further from the screen until warped position reaches the back wall where no warping is performed.

We next describe another class of embodiments, in which a speaker channel-based audio program (comprising speaker channels but not object channels) is generated in response to an object based program in a manner including a warping step (e.g., using screen-related metadata). The speaker channel-based audio program includes at least one set of speaker channels, generated as a result of warping audio content of the object based program to a degree determined at least in part by a warping degree parameter (and/or using an off-screen warping parameter), and intended for playback by loudspeakers positioned at predetermined locations relative to a playback system display screen. In some embodiments in this class, the speaker channel-based audio program is generated to include two or more selectable sets of speaker channels, and at least one of the sets is generated as a result of warping and is intended for playback by loudspeakers positioned at predetermined locations relative to a playback system display screen. The generation of the speaker channel-based program supports screen-relative rendering by a playback system not configured to perform decoding and rendering an object based audio program (but capable of decoding and rendering a speaker channel-based program). Typically, the speaker channel-based program is generated by a remixing system having knowledge of (or which assumes) a specific playback system speaker and screen configuration. Typically, the object based program (in response to which the speaker channel-based program is generated) includes screen-related metadata which supports screen-relative rendering of the object based program by a suitably configured playback system (capable of decoding and rendering object based programs).

This class of embodiments is particularly useful in cases in which it is desired to implement screen-relative rendering but where the available playback system(s) are not configured to render object based programs. To implement screen-relative rendering of an audio program comprising speaker channels only (not object channels), an object based program which supports screen-relative rendering is first generated in accordance with an embodiment of the invention. Then, a speaker channel-based audio program (which supports screen-relative rendering) is generated in response to the object based program. The speaker channel-based audio program may include at least two selectable sets of speaker channels, and the playback system may be configured to render a selected one of the sets of speaker channels to implement screen-relative rendering.

Common speaker channel configurations assumed by speaker channel based programs include stereo (for playback using two speakers) and 5.1 surround sound (for playback by five full-range speakers). With such channel configurations, the speaker channels (audio signals) are by definition associated with loudspeaker locations, and the perceived positions at which audio elements (indicated by audio content of the channels) are rendered are typically determined based on assumed speaker locations in a playback environment, or assumed speaker locations relative to a reference listening position.

In some embodiments in which a speaker channel-based audio program is generated (in response to an object based program), the screen-relative warping (scaling) functionality enabled by screen-related metadata of the object based program is utilized to generate speaker channels (of the speaker channel-based program) which are associated with loudspeakers having predetermined positions relative to a playback screen. Typically, specific playback screen size and shape, as well as position, are assumed by the system which generates the speaker channel based program. For example, in response to an object based program, the speaker channel-based program can be generated to include the following two sets of speaker channels (and optionally also other speaker channels):

a first set of conventional Left ("L") and Right ("R") front speaker channels, for rendering audio elements at perceived positions determined (e.g., in a cinema mixing facility) relative to a reference screen; and a second set of left and right front speaker channels, which may be referred to as "left screen" (Lsc) and "right screen" (Rsc), for rendering the same audio elements at perceived positions determined (e.g., at a remixing facility or a remixing stage of a mixing facility) relative to the left and right edges of the assumed playback display screen (where the playback screen and playback system front speakers are assumed to have predetermined relative sizes, shapes and positions).

Typically, the channels of the speaker channel-based program which are generated as a result of warping (e.g., Lsc and Rsc channels) can be rendered to allow for closer proximity match between images displayed on the playback screen and corresponding rendered sounds.

By selecting and rendering the conventional Left ("L") and Right ("R") front speaker channels, a playback system can render the selected channels so that audio elements determined thereby are perceived to have unwarped positions. By selecting and rendering the "left screen" (Lsc) and "right screen" (Rsc) speaker channels, the playback system can render the selected channels such that the audio elements determined thereby are perceived to have warped positions (relative to the playback screen), but the warping is performed at the time of generation of the speaker channel-based program (in response to an object based program, which typically includes screen-related metadata) rather than by the playback system.

Some embodiments in this class include steps of: generating (at a mixing time and location) an object based program with screen-related metadata; then (at a "remixing" time and location, which could be at the same location at which the original mixing was done, e.g., to generate recordings for home use) using the screen-related metadata to generate a speaker channel-based program from the object based program including by performing screen-relative warping; and then delivering the speaker channel-based program to a playback system. The speaker channel-based program can include multiple selectable sets of channels, including a first set of speaker channels (e.g., L and R channels generated in a conventional manner) which are generated without performing warping and are indicative (when rendered) of at least one audio element perceived to be at least one unwarped position, and at least one extra set of speaker channels (e.g., Lsc and Rsc channels) which are generated as a result of warping of content of the object based program and are indicative (when rendered) of the same audio element but perceived to be at least one different (i.e., warped) position. Alternatively, the speaker channel-based program includes only one set of channels (e.g., Lsc and Rsc channels) generated as a result of warping and indicative (when rendered) of at least one audio element perceived at least one warped position, but not also another set of channels (e.g., L and R channels) indicative (when rendered) of the same audio element perceived at an unwarped position.

The speaker channel-based program generated from an object based program, in accordance with an exemplary embodiment, includes five front channels: left (L), left screen (Lsc), center (C), right screen (Rsc), and right (R). The Lsc and Rsc channels are generated by performing warping using screen-related metadata of the object based program. To render and playback the speaker channel-based program, the playback system may select and render the L and R channels to drive front speakers at the left and right edges of the playback screen, or may select and render the Lsc and Rsc channels to drive front speakers farther from the left and right edges of the playback screen. For example, the Lsc and Rsc channels may be generated on the assumption that they will be used to render audio elements using front speakers at azimuthal angles of +30 and −30 degrees relative to an assumed user position, and the L and R channels may be generated on the assumption that they will be used to render audio elements using front speakers at azimuthal angles of +15 and −15 degrees (at left and right edges of a playback screen) relative to an assumed user position.

Figure 5:
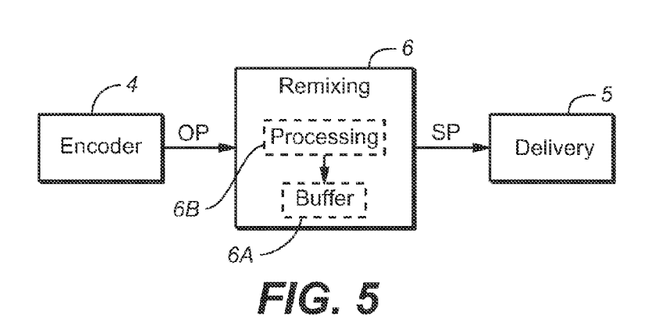
FIG. 5 is a block diagram of elements of a system configured to perform another embodiment of the inventive method.

For example, the system of FIG. 5 includes an encoder 4 configured to generate an object based audio program ("OP"), including screen-related metadata, in accordance with an embodiment of the invention. Encoder 4 may be implemented in or at a mixing facility. The system of FIG. 5 also includes remixing subsystem 6 which is coupled and configured to generate (in accordance with an embodiment of the invention) a speaker channel-based audio program ("SP") which comprises speaker channels but not object channels, in response to the object based audio program generated by encoder 4. Subsystem 6 may be implemented in or at a remixing facility, or as a remixing stage of a mixing facility (e.g., a mixing facility in which encoder 4 is also implemented). The audio content of speaker channel-based program SP includes at least two selectable sets of speaker channels (e.g., one set comprising above-discussed channels L and R, and another set comprising above-discussed channels Lsc and Rsc), and subsystem 6 is configured to generate at least one of the sets (e.g., channels Lsc and Rsc) as a result of warping audio content of object based program OP (generated by encoder 4) using screen-related metadata of program OP in accordance with an embodiment of the invention (and typically also using other control data indicative of type and/or degree of warping, but not indicated by the screen-related metadata) in accordance with an embodiment of the invention. The speaker channel-based program SP is output from subsystem 6 to delivery subsystem 5. Subsystem 5 can be identical to above-discussed subsystem 5 of the FIG. 3 system.

Embodiments of the invention may be implemented in hardware, firmware, or software, or a combination thereof (e.g., as a programmable logic array). For example, the system of FIG. 3 (or subsystem 3, or subsystems 7, 9, 10, and 11 thereof) may be implemented in appropriately programmed (or otherwise configured) hardware or firmware, e.g., as a programmed general purpose processor, digital signal processor, or microprocessor. Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., a computer system which implements the system of FIG. 3 (or subsystem 3, or subsystems 7, 9, 10, and 11 thereof)), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

While implementations have been described by way of example and in terms of exemplary specific embodiments, it is to be understood that implementations of the invention are not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for rendering an audio program, including steps of:
   (a) determining at least one warping degree parameter; and
   (b) performing warping on audio content of at least one channel of the program to a degree determined at least in part by the warping degree parameter corresponding to said channel, where each said warping degree parameter is indicative of a maximum degree of warping to be performed on corresponding audio content of the program by a playback system, wherein the warping includes determination of a value, Xs, which indicates unwarped position, along a width axis, of an audio element to be rendered at a warped position along the width axis, and generation of values:

$X\text{warp}$, $Y\text{FACTOR} = y^{EXP}$, and $X' = x \cdot Y\text{FACTOR} + (1 - Y\text{FACTOR}) \cdot [X\text{FACTOR} \cdot X\text{warp} + (1 - X\text{FACTOR}) \cdot x)]$, wherein
- Xwarp denotes raw warped position of the audio element along the width axis relative to an edge of a playback screen,
- EXP is an off-screen warping parameter,
- YFACTOR indicates degree of warping along the width axis as a function of warped position, y, of the audio element along a depth axis at least substantially perpendicular to the playback screen's plane,
- X' denotes warped object position of the audio element along the width axis relative to the edge of the playback screen, and
- XFACTOR is one said warping degree parameter.

2. The method of claim 1, wherein step (a) includes a step of determining at least one off-screen warping parameter, where the off-screen warping parameter is indicative of at least one characteristic of off-screen warping on corresponding audio content of the program by a playback system, and wherein the warping performed in step (b) includes off-screen warping determined at least in part by at least one said off-screen warping parameter.

3. The method of claim 2, wherein the off-screen warping parameter controls a degree of warping of an unwarped position of an audio element along a width axis at least substantially parallel to the plane of a playback screen, as a function of distance, of a warped position at which the audio element is to be rendered, at least substantially perpendicular to the plane of the playback screen.

4. The method of claim 1, wherein the program is an object based audio program, and step (a) includes a step of parsing the program to identify at least one said one warping degree parameter which is indicated by screen-related metadata of the program.

5. The method of claim 4, wherein the program is indicative of at least two objects, step (a) includes a step of independently determining at least one warping degree parameter for each of the objects, and step (b) includes a step of:
- independently performing warping on audio content of each of the object channels to a degree determined at least in part by the at least one warping degree parameter which corresponds to said each of the objects.

6. The method of claim 1, wherein each said warping degree parameter is a non-binary value indicative of a maximum degree of warping to be performed on corresponding audio content of the program by the playback system.

7. A method of rendering a speaker channel-based program including two or more selectable sets of speaker channels, at least one of the sets is indicative of unwarped audio content of an object based audio program, and another one of the sets is indicative of warped content, wherein the speaker channel-based program has been generated by processing the object based audio program including by warping audio content of the object based audio program to a degree determined at least in part by at least one warping degree parameter, to generate the set of speaker channels indicative of warped content, where each said warping degree parameter is indicative of a maximum degree of warping to be performed on corresponding audio content of the object based audio program by a playback system, said method of rendering including steps of:
(a) parsing the speaker channel-based program to identify speaker channels of the speaker channel-based program, including each said set of speaker channels indicative of warped content;
(b) selecting one of the sets which is indicative of warped content; and
(c) generating speaker feeds, for driving loudspeakers positioned at predetermined locations relative to a playback screen, in response to at least some of the speaker channels of the speaker channel-based program, including at least said selected set of speaker channels indicative of warped content.

8. The method of claim 7, wherein the speaker channel-based program has been generated by processing the object based audio program including by performing off-screen warping of audio content of the object based audio program, to a degree determined at least in part by the at least one warping degree parameter, and using at least one off-screen warping parameter indicative of at least one characteristic of off-screen warping on corresponding audio content of the object based program.

9. A system, including one or more components that:
- parse a multi-channel audio program to identify channels of the program; and
- perform warping on audio content of at least one channel of the program to a degree determined at least in part by at least one warping degree parameter corresponding to said channel, where each said warping degree parameter is indicative of a maximum degree of warping to be performed on corresponding audio content of the program by a playback system, wherein the warping includes determination of a value, Xs, which indicates unwarped position, along a width axis, of an audio element to be rendered at a warped position along the width axis, and generation of values:

$X\text{warp}$, $Y\text{FACTOR} = y^{EXP}$, and $X' = x \cdot Y\text{FACTOR} + (1 - Y\text{FACTOR}) \cdot [X\text{FACTOR} \cdot X\text{warp} + (1 - X\text{FACTOR}) \cdot x)]$, wherein
- Xwarp denotes raw warped position of the audio element along the width axis relative to an edge of a playback screen,
- EXP is an off-screen warping parameter,
- YFACTOR indicates degree of warping along the width axis as a function of warped position, y, of the audio element along a depth axis at least substantially perpendicular to the playback screen's plane,
- X' denotes warped object position of the audio element along the width axis relative to the edge of the playback screen, and
- XFACTOR is one said warping degree parameter.

10. The system of claim 9, wherein the warping includes off-screen warping determined at least in part by at least one off-screen warping parameter, where the off-screen warping parameter is indicative of at least one characteristic of off-screen warping on corresponding audio content of the program by a playback system.

11. The system of claim 10, wherein the off-screen warping includes warping, to a degree controlled by the off-screen warping parameter, of an unwarped position of an audio element along a width axis at least substantially parallel to the plane of a playback screen, as a function of distance of distance, of a warped position at which the audio element is to be rendered, at least substantially perpendicular to the plane of the playback screen.

12. The system of claim 9, wherein the program is an object based audio program, and the first subsystem is configured to parse the program to identify at least one said one warping degree parameter which is indicated by screen-related metadata of the program.

13. The system of claim 12, wherein the program is indicative of at least two objects, the first subsystem is configured to determine independently at least one warping degree parameter for each of the objects, and the processing subsystem is configured to perform warping independently on audio content indicative of each of the objects to a degree determined at least in part by the at least one warping degree parameter which corresponds to said each of the objects.

14. The system of claim 9, wherein each said warping degree parameter is a non-binary value indicative of a maximum degree of warping to be performed on corresponding audio content of the program by the playback system.

15. A system for rendering a speaker channel-based program including two or more selectable sets of speaker channels, at least one of the sets is indicative of unwarped audio content of an object based audio program, and another one of the sets is indicative of warped content, wherein the speaker channel-based program has been generated by processing the object based audio program including by warping audio content of the object based audio program to a degree determined at least in part by at least one warping degree parameter, to generate the set of speaker channels indicative of warped content, where each said warping degree parameter is indicative of a maximum degree of warping to be performed on corresponding audio content of the object based audio program by a playback system, said system including one or more components that:
  parse the speaker channel-based program to identify speaker channels of the program, including each said set of speaker channels indicative of warped content;
  select one of the sets which is indicative of warped content; and
  generate speaker feeds, for driving loudspeakers positioned at predetermined locations relative to a playback screen, in response to at least some of the speaker channels of the speaker channel-based program, including at least said selected set of speaker channels indicative of warped content.

16. The system of claim 15, wherein each said warping degree parameter is a non-binary value indicative of a maximum degree of warping to be performed on corresponding audio content of the program by the playback system.

* * * * *